United States Patent [19]

Chin

[11] Patent Number: 4,587,552
[45] Date of Patent: May 6, 1986

[54] APPARATUS FOR GENERATING THE MAGNITUDE OF THE VECTOR SUM OF TWO ORTHOGONAL SIGNALS AS FOR USE IN A DIGITAL TV RECEIVER

[75] Inventor: Danny Chin, Plainsboro, N.J.
[73] Assignee: RCA Corporation, Princeton, N.J.
[21] Appl. No.: 529,136
[22] Filed: Sep. 2, 1983
[51] Int. Cl.[4] .............................................. H04H 9/64
[52] U.S. Cl. ....................................... 358/28; 364/730
[58] Field of Search ........................ 364/729, 730, 818; 358/28

[56] References Cited

U.S. PATENT DOCUMENTS 3,710,087 1/1973 Siegel ................................... 364/818
4,412,181 10/1983 Marguinaud et al. ................. 329/50

OTHER PUBLICATIONS

Patent Application Ser. No. 501,896, "An Auto-Tint Circuit for a TV Receiver", D. Chin.
Patent Application Ser. No. 487,107, "Automatic Tint Correction as for a Digital TV Receiver", Lewis et al.

*Primary Examiner*—John W. Shepperd
*Attorney, Agent, or Firm*—E. M. Whitacre; P. J. Rasmussen; E. P. Herrmann

[57] ABSTRACT

For real time processing of wide-band signals, the magnitude, C, of the vector sum of substantially orthogonal component vectors $\overline{A}$ and $\overline{B}$ is performed with minimal circuitry by employing the algorithm $$C = A + KB \quad A > B$$

and $$C = B + KA \quad A > B$$

where A and B are the magnitudes of vectors $\overline{A}$ and $\overline{B}$ and the factor K is related to the phase angle $\theta$ of the vector sum relative to the axis vector A. For precise values of C, the value K is determined from the equation $$K = (1 - \cos\theta)/\sin\theta \quad A > B$$

$$K = (1 - \sin\theta)/\cos\theta \quad A < B.$$

17 Claims, 4 Drawing Figures

APPARATUS FOR GENERATING THE MAGNITUDE OF THE VECTOR SUM OF TWO ORTHOGONAL SIGNALS AS FOR USE IN A DIGITAL TV RECEIVER

The present invention relates to circuitry for producing the approximate value of the magnitude of the vector sum of two orthogonally related signals. The invention has general applicability regarding its intended function but is particularly useful in digital TV receivers and will be described in this context.

BACKGROUND OF THE INVENTION

In many electronic systems it is necessary to determine the magnitude of the vector sum of orthogonal signals. For example, in digital TV receivers it is convenient to perform automatic flesh color correction by manipulating the magnitude and phase of the chrominance vector. This vector, however, is present in the form of quadrature signals represented by the I and Q or (R-Y) and (B-Y) color mixture signals. Thus, to perform the required manipulation, the magnitude of the chrominance vector must be determined from its component parts.

It is well known that the magnitude of a vector may be ascertained by generating the square root of the sum of the squares of the amplitude values of its orthogonal components. This may be accomplished with the use of multiplier circuits for squaring the amplitude values, adder circuitry for summing the squares, and square root circuitry for determining the square root of the sum. Alternatively, the function may be performed by producing the logarithms of the component amplitude values, appropriately combining the logarithms and generating the antilogs to produce the magnitude values of the vector. A further approach is to combine the magnitude value of the component vectors as an address code applied to a memory programmed to produce output values corresponding to the magnitude of the vector sum of the applied address codes.

It will be readily appreciated by those skilled in the art of signal processing that each of the foregoing methods require significant amounts of processing hardware and increases superlinearly with increasing signal bits. In addition, the necessary components are not readily available to perform real time processing for wide band signals. These factors are particularly restrictive shortcommings in a digital TV receiver context where it is desirable to maintain circuit components to a minimum and the components are to be realized in VLSI integrated form.

SUMMARY OF THE INVENTION

The present inventor realized that a close approximation to the magnitude, C, of the vector sum of component vectors, I and Q, can be generated from the sums of the magnitudes of the vector components according to the algorithm $C=I+KQ$ for I greater than Q and $C=Q+KI$ for I less than Q where I and Q represent the magnitudes of quadrature related component vectors. The factor K is a variable which is related to the phase angle of the vector C relative to one of the vectors I and Q. The circuitry required to produce the magnitude of the vector C with this algorithm, is significantly reduced from and more readily realizable than the circuitry required by the aforementioned methods.

BRIEF DESCRIPTION OF THE DRAWING

FIG. 3b is a timing diagram showing the clock operation in FIG. 3a.

DETAILED DESCRIPTION OF THE INVENTION

Figure 1:
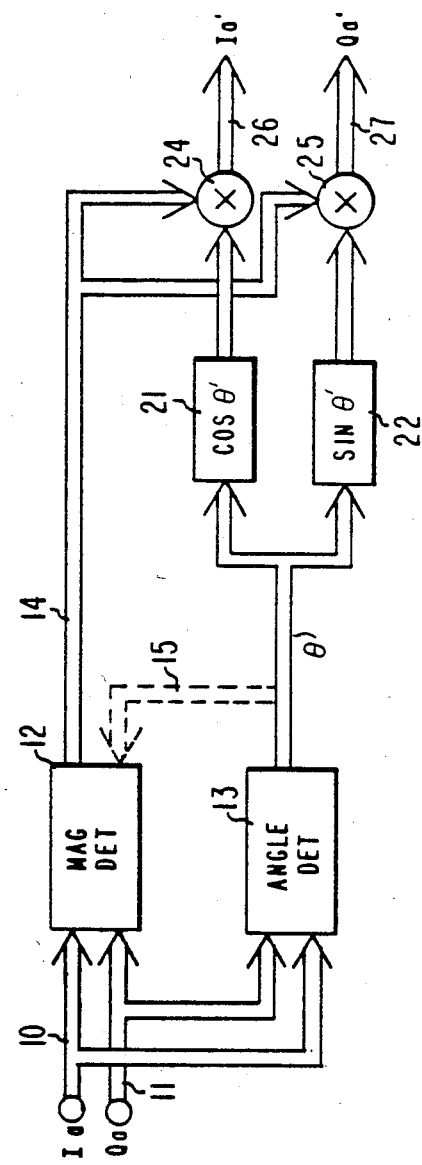
FIG. 1 is a block diagram of exemplary prior art circuitry for performing auto-flesh correction in a digital TV receiver.

The circuit of FIG. 1 exemplifies apparatus for performing auto-flesh correction in a digital TV receiver. The circuitry is located in the color signal processing section of the receiver and operates upon the color components of the composite signal after separation from the luminance component, etc. The presumption is made that the signal is in digital format (e.g. 8 bit parallel PCM signals) though the concepts are applicable to analog signal processing. A detailed description of the circuit operation may be found in copending application Ser. No. 501,896 filed on June 7, 1983 and entitled "An Auto Tint Circuit for a TV Receiver" incorporated herein by reference.

Briefly the FIG. 1 circuit operates as follows. Auto-flesh correction is performed by rotating the chrominance vector toward the I component vector whenever the phase angle of the chrominance vector is within a particular range of values associated with flesh colors. The chrominance vector, however, is represented by its component parts in the form of the substantially orthogonal color mixture signal vectors I and Q. The circuit outputs a rotated chrominance signal represented by substantially orthogonal color mixture signals I' and Q' corresponding to the rotated chrominance vector.

I and Q signals are respectively applied to terminals 10 and 11 from which they are both routed to a magnitude detector 12 and an angle detector 13. The magnitude detector generates a signal C representing the magnitude of the vector sum of the I and Q signals, e.g. $C=\sqrt{I^2+Q^2}$ and produces this signal on bus 14. The angle detector produces a signal on bus 15 representing the angle $\theta$. The angle signal is applied as address codes to elements 21 and 22 which produce respectively, the sine and cosine values of the arguments corresponding to the address codes applied to their inputs. Elements 21 and 22 may be read only memories (ROM's). For angles $\theta$, which do not reside within the range of angles ascribed to flesh tones, the ROM's are programmed to output the sines and cosines of the applied angle values. For angles $\theta$, which are within the range of angles associated with flesh tones, the ROM's produce sines and cosines of angles corresponding to $\theta+\Delta\theta$ where $\Delta\theta$ represents the desired rotation and is a function of $\theta$.

The cosine and sine values are respectively applied to multipliers 24 and 25 wherein they are multiplied by the magnitude values C generating the flesh corrected component vectors $I'=C\cos\theta'$ and $Q'=C\sin\theta'$.

Figure 2:
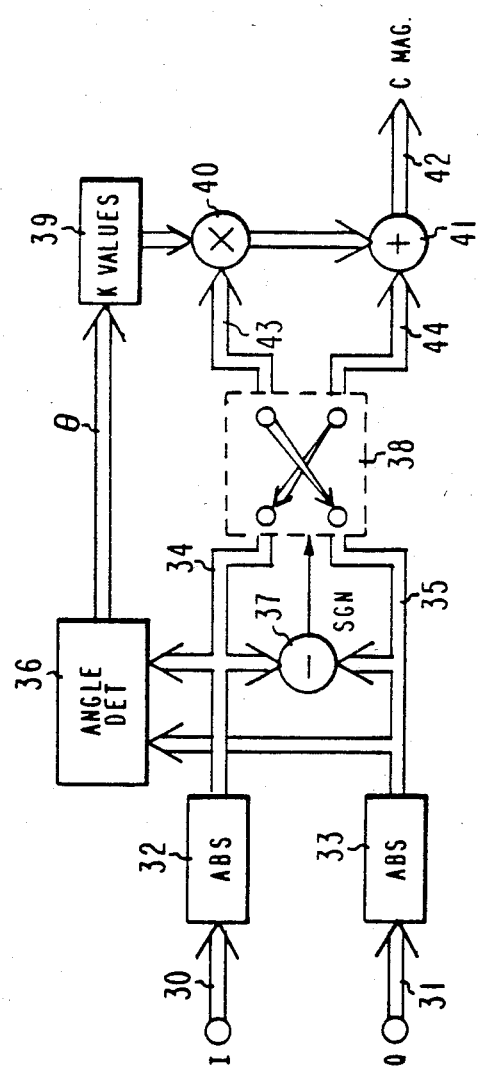
FIGS. 2 and 3a are block diagrams of circuitry for generating the magnitude of the vector sum of orthogonal vectors embodying the present invention.

FIG. 2 illustrates circuitry embodying the present invention which may be substituted for the magnitude detector 12 of FIG. 1. The FIG. 2 circuit generates the magnitude of the vector sum, C, of vectors I and Q according to the algorithm $$C=I+KQ, I>Q \qquad (1a)$$

and $$C = Q + KI, \quad I < Q. \tag{1b}$$

The factor K is a variable depending on the angle $\theta$ between the vector sum and the axis of one of the component vectors I or Q. For example, if $\theta$ is the angle between the vector sum and the I vector axis, then for $C=I+KQ$, $I>Q$ to exactly equal the magnitude of the vector sum, it can be shown that K must equal $(1-\cos\theta)/\sin\theta$ and for $C=Q+KI$, $I<Q$, K must be equal to $(1-\sin\theta)/\cos\theta$. Over the range of $\theta$ from zero to ninety degrees K is substantially monotonically increasing from a value of zero at zero degrees, to a value of 0.41 at 45 degrees then substantially monotonically decreasing from a value of 0.41 at 45 degrees to a value of zero at 90 degrees.

For each value of $\theta$ a value of K may be calculated for use in the calculation of C via equations (1a) and (1b). The K value may be programmed into a ROM which is addressed by the $\theta$ values to eliminate the necessity of real time calculations. If it is not required to have exact values for C, then the same value of K may be utilized over a range of angles to reduce the ROM size. For example, if only thirteen K values are utilized over the range of 0 to 45 degrees (each K value covering approximately 3.5 degrees) the maximum error in C can be constrained to less than one/half percent.

K, in equations (1a) and (1b) is a weighting factor. For digital systems weighting circuitry is significantly simplified if the weighting coefficients are constrained to be multiples of reciprocal powers of 2. This permits multiplication to be performed by simple bit shifting and/or bit shift and add techniques which are well known. Selecting K values according to this criterion does sacrifice the accuracy of the calculated C values, however. For example, if thirteen values of K (selected with this criterion) are used over the 0–45 degree range (see Table I) the maximum percent error will still be only 1.6 percent and will occur over small ranges of angles where the K values change.

TABLE I

| $\theta$ Range Degrees | | K Factor |
|---|---|---|
| 0–5.2 | (84.8–90) | 1/32 = .031 |
| 5.2–9.0 | (81–84.8) | 2/32 = .063 |
| 9.0–12.4 | (77.6–81) | 3/32 = .094 |
| 12.4–16.0 | (74–77.6) | 4/32 = .125 |
| 16.0–19.4 | (70.6–74) | 5/32 = .156 |
| 19.4–23.0 | (67–70.6) | 6/32 = .188 |
| 23.0–26.4 | (63.6–67) | 7/32 = .219 |
| 26.4–29.6 | (60.4–63.6) | 8/32 = .250 |
| 29.6–33.0 | (57–60.4) | 9/32 = .281 |
| 33.0–36.4 | (53.6–57) | 10/32 = .313 |
| 36.4–39.4 | (50.6–53.6) | 11/32 = .344 |
| 39.4–42.4 | (47.6–50.6) | 12/32 = .375 |
| 42.4–45 | (45–47.6) | 13/32 = .406 |

Since the magnitude, C, of the vector sum of I and Q is an unsigned scalor the calculation is performed using the absoluted or unsigned magnitude values of the component vectors I and Q. This simplifies angle detection because the range of possible angles is limited to 0–90 degrees regardless of the quadrant in which the C vector resides.

In FIG. 2, signal samples corresponding to the orthogonal I and Q vector components are applied respectively to terminals 30 and 31 from which they are routed to circuit elements 32 and 33. Elements 32 and 33 produce the absolute values of the applied signal samples and may be circuits which selectively complement the signals responsive to the appropriate sign bit of the respective sample.

The absolute values of I and Q are applied to subtractor circuit 37 via buses 34 and 35. The sign of the difference is an indication of whether the magnitude of I is greater or lessor than the magnitude of Q, e.g. if I is greater than Q the sign bit is a logic one and if I is less than Q the sign bit is a logic zero. The sign bit (Sgn) is applied to switch 38 to control the switch positions thereof. Switch 38 has first and second input ports or terminals respectively coupled to buses 34 and 35. It also has first and second output ports connected respectively to buses 43 and 44. Responsive to the sign bit from element 37, switch 38 applies the Q samples from element 33 to bus 43 (I>Q) and the I samples from element 32 to bus 44, or for I less than Q applies the I samples to bus 43 and the Q samples to bus 44.

Bus 43 is coupled to one input port of multiplier element 40 which may be a shift and add weighting circuit. K values, or control signals corresponding to K values, from element 39, are applied to a second input of multiplier 40. Element 40 generates output values corresponding to the sample values applied thereto weighted by K.

The weighted samples from element 40 are applied to one input port of adder circuit 41 and the samples on bus 44 are applied to a second input port of adder 41. The output sums of adder 41 correspond to the magnitude C according to equations (1a) and (1b).

Angle values, $\theta$, are generated by element 36 which is coupled to buses 34 and 35. Element 36 may comprise log tables responsive to the I and Q samples for generating the samples log I and log Q, a subtractor for generating the differences equal to log Q−log I and an antilog table responsive to the differences for producing the arctangents, $\theta$, of the log differences. The $\theta$ values are applied to element 39 which produces the K factors or control signals corresponding to the K factors. Note if multiplier 40 is a true multiplier circuit, then actual coefficients equal to the K values are required. Alternatively, if element 40 is for example a shift and add type weighting circuit then the values produced by element 39 will be signals necessary to control the requisite bit-shifts to generate the desired weighted sample values.

From Table I, it is seen that the K values are mirrored about 45 degrees so that only K values between zero and 45 degrees need be calculated and stored in element 39. Angle detector 36 may therefore be designed to develop output values of from 0 to 45 degrees. This is most easily accomplished by applying the absolute values of the sample values on buses 43 and 44 as the inputs to element 36. Recalling that the vectors are switched on buses 43 and 44, for I>Q, element 36 will produce the angle values, $\theta$, equal to from 0 to 45 degrees, i.e. the arctan (Q/I). For I<Q element 36 will produce the values of arctan (I/Q) which can be shown to equal $90-\theta$ degrees, so that the angle values produced by element 36 for $\theta$ equal to from 45 to 90 degrees will be angle values from 45 to 0 degrees. If in fact, angles $\theta$ from 0 to 90 degrees are generated by detector 36, all of the sample values C can be generated with equation (1a) and the appropriate K factors. In this instance elements 37 and 38 may be excluded from the circuitry. On the other hand, elements 36, 39 and 40 become more complicated.

If the circuit of FIG. 2 is implemented in a FIG. 1 type arrangement angle detector 36 may be eliminated and the angle values secured from the FIG. 1 angle detector 13 (via the bus shown by the broken lines 15). Note that for the condition that angle detector 13 produces the full range of angles θ from 0–360 degrees element 39 will include a decoder to translate the 0–360 range of angles to either a range of angles from 0–45 degrees or a range of angles from 0–90 degrees.

Figure 3A:
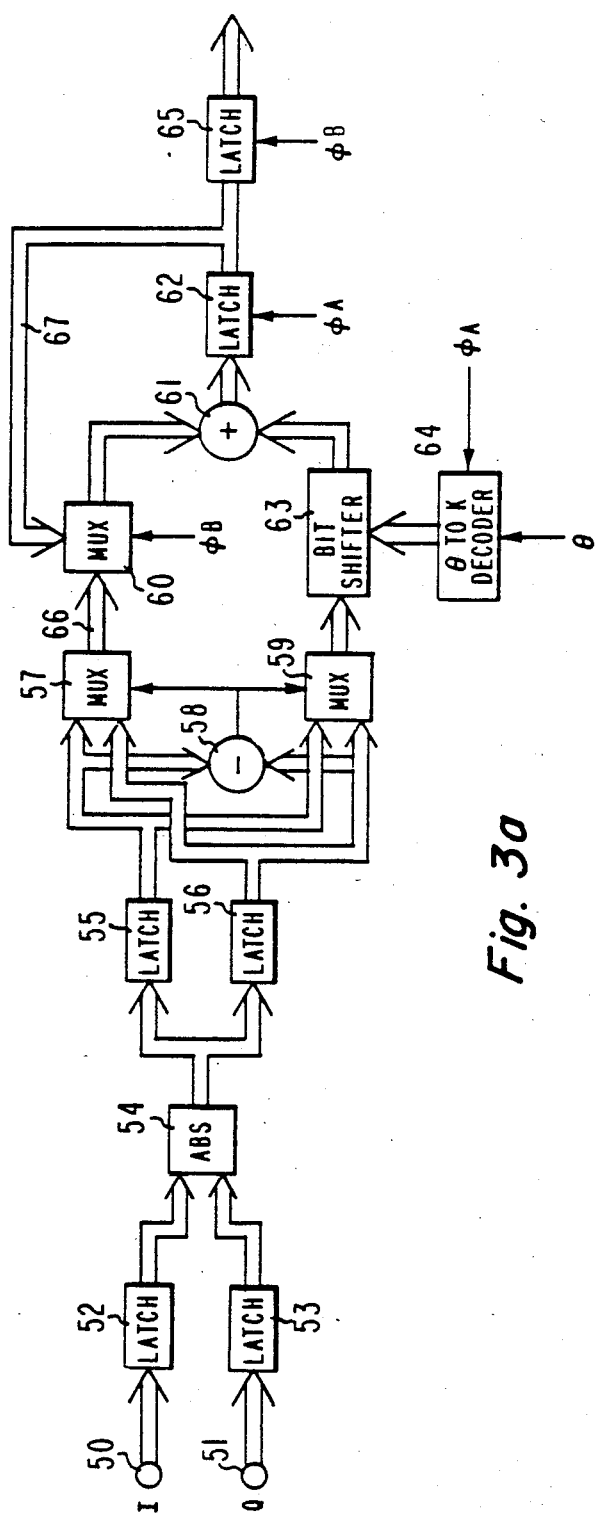

FIG. 3 is a variation of the FIG. 2 circuit. In the circuit the I and Q orthogonal vectors are applied to input ports 50 and 51. These signals are multiplexed through a single absolute value circuit 54 via the latches 52, 53, 55 and 56 by techniques known in the digital signal processing arts. Absolute values of I and Q from latches 55 and 56 are applied to subtractor 58 which developes a sign bit output indicative of which of the samples I or Q is greater. The sign bit from subtractor 58 is applied as a control signal to multiplexers 57 and 59. Both I and Q signals from latches 55 and 56 are applied as input signals to both multiplexers 57 and 59. Responsive to the sign bit output from subtractor 58, multiplexer 57 outputs the larger of the I and Q samples and multiplexer 59 outputs the smaller. (Multiplexers 57 and 59 perform the function of switch 38 in FIG. 2.)

Output samples from multiplexer 57 on bus 66 are applied to one input of a further multiplexer 60 which receives a second input from latch 62. The output of multiplexer 60 is applied as a first input to adder circuit 61.

Output samples from multiplexer 59 are applied to the signal input of a bit-shifter 63, the output of which is applied as a second input to adder 61. Bit shifter 63 (e.g. Advanced Micro Devices Inc. AM25S10 Bit Shifter) shifts all of the bits of the input sample rightward N bit positions, the value N being a control signal supplied from element 64. A rightward shift of N bit positions divides the sample values by $2^N$, i.e. if the sample is bit shifted rightward 3 bit positions the sample value is divided by 8. To divide a binary number by values intermediate to the $2^{Nth}$ factors, a sample may be successively bit shifted by different bit positions, the successive results stored and then summed.

Figure 3B:
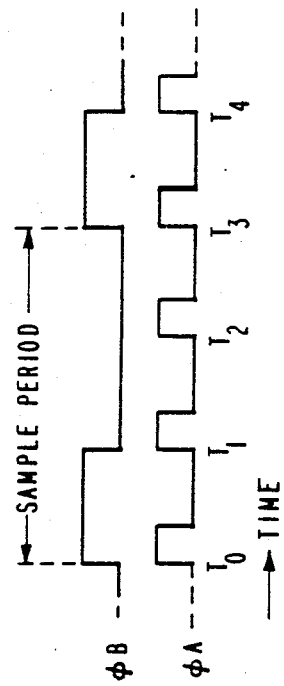

In the FIG. 3 arrangement, a single adder (61) is employed to perform the additions of equations (1a) and (1b) and the addition required for performing shift and add weighting. The output of adder 61 is applied to a latch 62 which stores intermediate results, which results are applied as input samples to multiplexer 60. Assume that the shift and add function undergoes three cycles per input sample period. At the beginning of a sample period, To, multiplexer 60 under the control of clock $\phi B$ (FIG. 3b) applies the sample from multiplexer 57, e.g. Io, to adder 61. During the same period a first shift control signal, corresponding to a K factor determined by the angle θ, is applied to bit shifter 63 by element 64 responsive to clocking signal $\phi A$. The current signal sample e.g. Qo from multiplexer 59 applied to shifter 63 is shifted N1 bit positions, dividing Qo by $2^{N1}$. The divided Qo sample and the Io sample are summed in adder 61 to produce the value $Io+Qo/2^{N1}$. This value is stored in latch 62 at time T1 by the leading edge of clock $\phi A$ going high. At time T1 multiplexer 60 disconnects the Io sample from the input to adder 61 and applies the value $Io+Qo/2^{N1}$. At time T1, under the control of clock $\phi A$, element 64 applies a second shift control signal to shifter 63 which bit-shifts the same Qo sample N2 bit positions. The value $Qo/2^{N2}$ is summed with the value $Io+Qo/2^{N1}$ in adder 61 and the new sum $Io+Qo/2^{N2}$ is stored in latch 62 at time T2. Simultaneously, at time T2 a third shift control value is applied to shifter 63 and sample Qo is bit shifted N3 bit positions producing the value $Qo/2^{N3}$. This value and the lastmost sum stored in latch 62 are summed in adder 61 generating the magnitude C according to the equation $$Co = Io + Qo/2^{N1} + Qo/2^{N2} + Qo/2^{N3} \qquad (2)$$

$$= Io + (1/2^{N1} + 1/2^{N2} + 1/2^{N3}) Qo \qquad (3)$$

$$= Io + KQo.$$

This final sum is then stored for further processing in latch 65, at the beginning of the subsequent sample period, under the control of clock $\phi B$. In the instance that the weighting can be performed by a signle bit shift cycle, the control signal applied to the bit shifter 63 during the second and third cycles is arranged to disable the outputs of the bit shifter so that the value zero will be added to the sum stored in latch 62 during these cycles. The system may be operated with more or less samples depending upon the desired accuracy or bandwidth/timing constraints, etc. and the 3 cycle/sample rate is strictly exemplary.

What is claimed is:

1. Apparatus for generating magnitude values, C, of the vector sum of component signal vectors A and B comprising:

means for applying signal vectors A and B;

means for generating signals corresponding to the angles θ of said vector sum relative to the axis of one of said signal vectors A and B;

means responsive to said θ signals for generating signals corresponding to values K;

means responsive to the signal vectors A and B for determining the signal vector A or B having the lessor magnitude;

means responsive to the signal corresponding to the values K for weighting the signal vector A or B having the lessor magnitude, by the factor K; and means for summing the weighted signal with the signal corresponding to the signal vectors A or B having the greater magnitude, the output of the summing circuit being substantially equal to the magnitude of the vector sum.

2. The apparatus set forth in claim 1 wherein the means for generating signals corresponding to values, K is a ROM having an address input port coupled to said means for generating signals corresponding to angles θ, and programmed to output said values corresponding to K responsive to angle values, θ, applied as address codes, and wherein the values K are developed from at least one of the expression $(1-\cos\theta)/\sin\theta$ and $(1-\sin\theta)/\cos\theta$.

3. Apparatus for generating the magnitude values of the vector sums of two component vectors comprising:

a source of signals corresponding to said two component vectors;

a source of angle values corresponding to the angle between said vector sum and the axis of one of said two component vectors;

means responsive to said angle values for generating coefficient values, K, related to said angle values;

means responsive to said values K for weighting signals applied thereto;

a summing circuit having a first input port coupled to said weighting means, having a second port and an output port;

means for coupling one of said two component vector signals from said source to the second input port of said summing circuit and the other of said two component vector signals to said weighting means; and wherein signal values, C, produced at the output port of said summing circuit represent the magnitude values of the vector sum of said two component vector signals.

4. The apparatus set forth in claim 3 wherein the means for coupling said source to said summing circuit and said weighting means includes at least one absolute value circuit coupled between said source and said summing and weighting means for providing only the magnitudes of said two component vector signals.

5. The apparatus set forth in claim 4 wherein the means for coupling said source to said summing circuit and said weighting means further includes:

means coupled to said at least one absolute value circuit for generating a control signal having a first state for the magnitude of said one of said two component vector signals being greater than the magnitude of said other of said two component vector signals and having a second state otherwise;

switch means responsive to said control signal for coupling the absolute values of the one of the two component vector signals having the larger magnitude to the second input of the summing circuit and the absolute values of the other of the two component vector signals to the weighting means.

6. The apparatus set forth in claim 5 wherein the weighting means comprises a shift and add circuit and the coefficient values K are in the form of bit-shift control signals.

7. The apparatus set forth in claim 5 wherein the means for generating the coefficient values K is a ROM having an address input port coupled to said source of angle values and programmed to output values K responsive to said angle values applied as address codes and wherein the values K are symmetric about a predetermined angle value.

8. The apparatus set forth in claim 3 wherein the weighting means comprises a shift and add circuit having a signal input port coupled to said means for coupling, having a control input port coupled to said means for generating coefficients, and wherein the coefficient values, K, are in the form of bit-shift control signals.

9. The apparatus set forth in claim 3 wherein the means for generating the coefficient values, K, is a ROM having an address input port coupled to said source of angle values, and programmed to output values K responsive to said angle values applied thereto as address codes.

10. The apparatus set forth in claim 9 wherein the ROM for generating coefficient values K is programmed to produce like values of K for predetermined ranges of angles values.

11. The apparatus set forth in claim 3 wherein the means for generating coefficient values K produces like values of K for predetermined ranges of angles values.

12. The apparatus set forth in claim 3 wherein the means for generating the coefficient values, K, is a ROM having an address input port coupled to said source of angle values, and programmed to output values K responsive to said angle values applied thereto as address codes and wherein the values K are developed from at least one of the expressions $(1-\cos\theta)/\sin\theta$ and $(1-\sin\theta)/\cos\theta$ where $\theta$ corresponds to the angle values.

13. Apparatus for generating the magnitude values, C, of the vector sum of two substantially orthogonal vector signals I and Q comprising:

means for applying said vector signals I and Q;

means responsive to said I and Q vectors for generating the angle, $\theta$, between the vector sum of the vectors I and Q and the axis of one of the I and Q vectors;

means responsive to the angles $\theta$ for generating signal values, corresponding to coefficients K;

an adder circuit having first and second input ports and an output port;

weighting means having a first input port coupled to said means for generating values, K, having a second input port for applying signal values and having an output port;

means for coupling the output port of said weighting means to the first input port of said adder circuit;

means for coupling the I vector signals to the second input port of said adder circuit;

means for coupling the Q vector signals to the second input port of said weighting circuit; and wherein the values available at the output port are equal to the sums I+KQ at least over a range of values $\theta$, and the sums I+KQ approximates the magnitude, C, of the vector sum of I and Q.

14. The apparatus set forth in claim 13 wherein the means for coupling the I signal vectors to the adder circuit and for coupling the Q signal vectors to the weighting means includes:

means responsive to the I and Q signals for generating a control signal when the magnitude of the I signal vector exceeds the magnitude of the Q signal vector;

switch means having input ports for applying the I and Q signal vectors and having a first output port coupled to the second input of the adder circuit and a second output port coupled to the second input of the weighting means, said switch means coupling the I and Q signal vectors to its first and second output ports respectively responsive to said control signal and coupling the I and Q signal vectors to its second and first output ports otherwise.

15. The apparatus set forth in claim 14 wherein the means for coupling the I signal vectors to the adder circuit and for coupling the Q signal vectors to the weighting means further includes means coupled between the means for applying the I and Q signal vectors and the adder circuit and weighting means for converting the I and Q signal vectors to signals corresponding to their magnitudes only.

16. A TV receiver having a color correction circuitry of the type which performs color correction by effectively rotating the chrominance vector, said circuitry operating on first and second substantially orthogonal color mixture signals and including means for calculating the magnitude and angle of the vector sum of said first and second color mixture signals, said color correction circuitry improved by having simplified magnitude calculating means wherein the improved magnitude calculating means comprises:

means for producing the absolute values of the first and second color mixture signals;

means responsive to the calculated angles for generating signals corresponding to values, K;

means for predetermining the first and second color mixture signal having the lessor magnitude;

means responsive to the signals corresponding to values, K, for weighting the absolute value of the first and second color mixture signal of lessor magnitude;

means for summing the weighted color mixture signal with the absolute value of the other non-weighted color mixture signal, the output of the summing means approximating the magnitude of the chrominance signal.

17. The apparatus set forth in claim 16 wherein the means for generating signals corresponding to values, K is a ROM having an input address port coupled to said means for calculating angles, and programmed to output said values corresponding to K responsive to angle values, $\theta$, applied as address codes, and wherein the values K are developed from at least one of the expression $(1-\cos\theta)/\sin\theta$ and $(1-\sin\theta)/\cos\theta$.

* * * * *